(12) United States Patent
Zhong et al.

(10) Patent No.: US 8,903,435 B2
(45) Date of Patent: Dec. 2, 2014

(54) METHOD AND SYSTEM FOR SHORT MESSAGE TERMINATION TRAFFIC CONTROL

(75) Inventors: Jian Zhong, Guangdong Province (CN); Yejuan Zhou, Guangdong Province (CN); Libo Sun, Guangdong Province (CN); Bing Ye, Guangdong Province (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 233 days.

(21) Appl. No.: 13/257,645

(22) PCT Filed: Sep. 24, 2009

(86) PCT No.: PCT/CN2009/974182
§ 371 (c)(1),
(2), (4) Date: Dec. 18, 2011

(87) PCT Pub. No.: WO2010/145104
PCT Pub. Date: Dec. 23, 2010

(65) Prior Publication Data
US 2012/0088528 A1    Apr. 12, 2012

(30) Foreign Application Priority Data

Jun. 30, 2009    (CN) .......................... 2009 1 0108408

(51) Int. Cl.
*H04W 4/00*    (2009.01)
*H04W 4/14*    (2009.01)
*H04L 12/58*    (2006.01)
*H04L 12/801*    (2013.01)
*H04L 12/825*    (2013.01)
*H04W 28/10*    (2009.01)
*H04W 28/02*    (2009.01)

(52) U.S. Cl.
CPC .............. *H04W 4/14* (2013.01); *H04L 12/5895* (2013.01); *H04L 47/14* (2013.01); *H04L 47/25* (2013.01); *H04L 51/38* (2013.01); *H04W 28/10* (2013.01); *H04W 28/02* (2013.01)
USPC ........................................................ 455/466

(58) Field of Classification Search
CPC ................................ H04W 28/02; H04W 4/14
USPC ........... 455/466, 425, 445, 423, 412.1, 67.11, 455/421; 370/474, 401, 338, 229, 522
See application file for complete search history.

(56) References Cited

U.S. PATENT DOCUMENTS

| 6,349,206 B1 * | 2/2002 | Reichelt et al. ............... 455/421 |
| 2003/0218987 A1 | 11/2003 | Loader et al. |
| 2005/0170837 A1 * | 8/2005 | Halsell .......................... 455/445 |

(Continued)

FOREIGN PATENT DOCUMENTS

| CN | 1832588 A | 9/2006 |
| CN | 101068376 A | 11/2007 |

(Continued)

OTHER PUBLICATIONS

International Search Report for PCT/CN2009/074182 dated Mar. 22, 2010.

*Primary Examiner* — Kiet Doan
(74) *Attorney, Agent, or Firm* — Stephen Yang; Ling Wu; Ling and Yang Intellectual Property (57) ABSTRACT

The present invention discloses a method for controlling short message terminated flow, including: a process that a SMS message center setting a terminated flow control threshold of a mobile switching center and controlling the terminated flow according to the threshold; the process including a step of the SMS message center dynamically setting the terminated flow control threshold according to the operation blocking level of short message service of the mobile switching center. The present invention also discloses a system for controlling short message terminated flow. With the SMS message center dynamically adjusting the terminated flow control threshold according to the load condition of the short message service of the mobile switching center, the present invention achieves adaptive terminated flow control of the mobile switching center and improves effectiveness of the flow control.

17 Claims, 5 Drawing Sheets

(56) References Cited

U.S. PATENT DOCUMENTS

| | | |
|---|---|---|
| 2005/0261012 A1 | 11/2005 | Weiser |
| 2006/0078008 A1* | 4/2006 | Bordonaro et al. .......... 370/522 |
| 2006/0109786 A1* | 5/2006 | Abdel-Kader et al. ....... 370/232 |
| 2007/0287425 A1* | 12/2007 | Bates ........................ 455/412.1 |
| 2008/0057939 A1* | 3/2008 | Choi-Grogan ............... 455/425 |
| 2008/0146259 A1* | 6/2008 | Chin et al. ................... 455/466 |

FOREIGN PATENT DOCUMENTS

| | | |
|---|---|---|
| CN | 101404811 A | 4/2009 |
| EP | 2068515 A1 | 6/2009 |
| GB | 2386793 A | 9/2003 |

* cited by examiner

METHOD AND SYSTEM FOR SHORT MESSAGE TERMINATION TRAFFIC CONTROL

TECHNICAL FIELD

The present invention relates to the short message service in mobile communication, and more especially, to a method and system for controlling short message terminated flow in the short message service.

BACKGROUND OF THE RELATED ART

The short message service is the most active service in the mobile value-added services, which has been increased constantly at a higher rate in recent years. The holiday characteristics of the short message service are also especially evident. In holidays such as the Spring Festival, the peak of service flow even comes up to 10 times the peak of regular flow or even more. As a result, huge resources such as the MSC (Mobile Switching Center), the BSS (Base Station System) and the paging channel are occupied, and other services such as the voice service are affected.z So far, the devices of SMS message center from each manufacturer are able to support the downlink (terminated) flow control to a certain degree. The method in use usually sets a fixed flow threshold for each MSC, and transfers in unit time granularity the downlink short messages whose number is within the threshold; those surpassing the threshold stops being sent, and the SMS message center directly modifies the status of the short messages to be "temporarily failed" to wait for retransmission or directly discards them.

The mobile network provides service for a plurality of services such as voice and SMS simultaneously, and system resources occupied by each service are different. The network load is decided by the sum of all services actually used by the users. So far, there is no mature and accurate service resource model established to address this issue, that is, whether the operation status of the MSC network element is blocking or not is related to the number of short message services, but the quantitative relationship cannot be accurately obtained in advance. Therefore, the MSC flow threshold is often preset as a fixed value by personal experiences, which might easily cause the threshold at certain times so big that the MSC still keeps transferring many short messages while it is very busy, which has a great impact on the MSC and occupies system and wireless resources, thus the purpose of the flow control cannot be achieved; sometimes the threshold is set so small that the message center suspends sending a lot of to-be-sent shot messages since the MSC is misjudged as busy when the MSC is actually idle, thus the available network resources are wasted and user service experience is affected.

SUMMARY OF THE INVENTION

The technical problem to be solved by the present invention is to provide a method and system for controlling short message flow to improve adaptability and effectiveness of flow control.

The technical problem of the present invention is solved by the following technical scheme:

a method for controlling short message terminated flow, comprising a process that a SMS message center sets a terminated flow control threshold of a mobile switching center and performs the terminated flow control according to the threshold; the process comprises steps of the SMS message center dynamically setting the terminated flow control threshold according to an operation blocking level of short message service of the mobile switching center.

The step of dynamically setting the terminated flow control threshold is specifically implemented as follows: the SMS message center setting the terminated flow control threshold of the mobile switching center in current time granularity according to terminated failure reason codes in last time granularity.

The process of the SMS message center setting the terminated flow control threshold of the mobile switching center in the current time granularity according to the terminated failure reason codes in the last time granularity is specifically implemented by following steps:

step S001, the SMS message center configures control attributes corresponding to the terminated failure reason code in the last time granularity;

step S002, the SMS message center calculates an adjustment value of the terminated failure reason code in the current time granularity based on the control attributes configured in step S001 and proportion of the terminated failure reason code in the last time granularity; and step S003, the SMS message center calculates the terminated flow control threshold in the current time granularity based on the adjustment value of the terminated failure reason code calculated in step S002.

The aforementioned method further comprises:

when the terminated flow in the current time granularity is less than or equal to the terminated flow control threshold in the current time granularity, the SMS message center normally delivering terminated in the current time granularity to the mobile switching center; and when the terminated flow in the current time granularity is more than the terminated flow control threshold in the current time granularity, the SMS message center saving the terminated in the current time granularity temporarily to wait for retransmission or directly discarding them.

The control attributes described in said step S001 comprise: proportion A of the terminated failure reason code and adjustment step length S; the adjustment value of the terminated failure reason code in step S002 is specifically calculated by a following formula: $S \times R \div A$, wherein R is the proportion of the terminated failure reason code in the last time granularity; and the terminated flow control threshold described in said step S003 can be specifically calculated by a following formula: $T - S \times R \div A$, wherein T is an empirical value of the terminated flow control threshold of the mobile switching center.

In the aforementioned method, the number of the terminated failure reason codes in the last time granularity is n, and n is a natural number greater than 1;

said step S001 comprises the SMS message center configuring the control attribute of each of the terminated failure reason codes;

said step S002 comprises the SMS message center calculating the adjustment value of the terminated failure reason code of each of the terminated failure reason codes based on the control attribute and proportion of each of the terminated failure reason codes, and R is the proportion of each of the terminated failure reason codes;

said step S003 comprises the SMS message center calculating the terminated flow control threshold based on the adjustment value of the terminated failure reason code of each of the terminated failure reason codes, and the terminated flow control threshold is calculated by the following formula: $T - S_1 \times R_1 \div A_1 - S_2 \times R_2 \div A_2 \ldots \ldots - S_n \times R_n \div A_n$, wherein $R_1$ is an adjustment value of the terminated failure reason code of a first terminated failure reason code in the terminated failure reason codes, and R2 is an adjustment value of the terminated failure reason code of a second terminated failure reason code in the terminated failure reason codes, and Rn is an adjustment value of the terminated failure reason code of a $n^{th}$ terminated failure reason code in the terminated failure reason codes; and T is the empirical value of terminated flow control threshold of the mobile switching center.

said step S003 also comprises the process that the SMS message center sets the empirical value of terminated flow control threshold of the mobile switching center.

The present invention provides a threshold adjustment module, and the threshold adjustment module is used to dynamically set a terminated flow control threshold of short message service of a mobile switching center according to an operation blocking level of the short message service of the mobile switching center.

The threshold adjustment module is further used to set the terminated flow control threshold of the mobile switching center in a current time granularity according to terminated failure reason codes in a last time granularity.

The threshold adjustment module is further used to calculate an adjustment value of the terminated failure reason code in the current time granularity based on the control attributes and proportion of the terminated failure reason code in the last time granularity.

The threshold adjustment module is further configured to configure the control attributes of the terminated failure reason codes, and to calculate the adjustment value of the terminated failure reason code in the current time granularity based on the control attributions and the proportion of the terminated failure reason code, and to calculate the terminated flow control threshold in the current time granularity of the short message service of the mobile switching center based on the adjustment value of the terminated failure reason code.

The control attributes comprise proportion A of failure reason code and adjustment step length S; and the threshold adjustment module is further used to calculate the adjustment value of the failure reason code by a formula of S×R÷A, wherein R is the proportion of the failure reason code in the last time granularity; and the threshold adjustment module is further used to calculate and adjust the terminated flow control threshold by a following formula: T−S×R÷A, wherein T is the empirical value of the terminated flow control threshold of the mobile switching center.

In the aforementioned threshold adjustment module, the number of the terminated failure reason codes in the last time granularity might be n, wherein n is a natural number greater than 1;

the threshold adjustment module is further configured:

to calculate the adjustment value of the terminated failure reason code of each of the terminated failure reason codes by the formula of S×R÷A, wherein R is the proportion of terminated failure reason code of each of the terminated failure reason codes; and to calculate the terminated flow control threshold in the current time granularity by a following formula: T−S1×R1÷A1−S2×R2÷A2 . . . . . . −Sn×Rn÷An, wherein R1 is an adjustment value of the terminated failure reason code of a first terminated failure reason code in the terminated failure reason codes, and R2 is an adjustment value of the terminated failure reason code of a second terminated failure reason code in the terminated failure reason codes, and Rn is an adjustment value of the terminated failure reason code of a $n^{th}$ terminated failure reason code in the terminated failure reason codes; and T is the empirical value of terminated flow control threshold of the mobile switching center.

The threshold adjustment module is further used to set the empirical value of terminated flow control threshold.

The threshold adjustment module is further configured to: when the terminated flow in the current time granularity is less than or equal to the terminated flow control threshold in the current time granularity, deliver terminated in the current time granularity normally to the mobile switching center; when the terminated flow in the current time granularity is more than the terminated flow control threshold in the current time granularity, save the terminateds in the current time granularity temporarily to wait for retransmission or directly discard them.

There might be a plurality of said mobile switching centers;

the threshold adjustment module is further configured to dynamically set the terminated flow control threshold of short message service of each of the mobile switching centers according to the operation blocking level of the short message service of each of the mobile switching centers.

The present invention also provides a system for controlling short message terminated flow, and the system comprises a SMS message center, and the SMS message center comprises the aforementioned threshold adjustment module.

Compared with the prior art, the beneficial effects of the present invention are:

(1) with the SMS message center dynamically setting the terminated flow control threshold according to the operation blocking level of short message service of MSC, the present invention implements the adaptive control of terminated flow of MSC and improves the effectiveness of the flow control;

(2) the SMS message center in the present invention sets the terminated flow control threshold of the mobile switching center in the current time granularity according to the terminated failure reason codes in the last time granularity, which has the real-time characteristic and can accurately adjust the short message terminated flow;

(3) calculating the adjustment value of the terminated failure reason code in the current time granularity by configuring the proportion of the terminated failure reason code of the MSC in the current time granularity and the proportion of the terminated failure reason code in the last time granularity, and adjusting the terminated flow threshold in the current time granularity according to the adjustment value of the terminated failure reason code in the current time granularity, the present invention truly reflects the blocking level of the MSC operation status and further improves the effectiveness of the control;

(4) the present invention uses the threshold adjustment calculation formula to update the threshold, and the calculation is simple and the implementation is convenient.

PREFERRED EMBODIMENTS OF THE PRESENT INVENTION

The present invention will be illustrated in further detail in combination with the accompanying drawings and specific embodiments in the following.

A MC (SMS Message Center) terminated process comprises two processes that the MC requests routing form HLR (Home Location Register) and the MC sends terminated messages to the MSC indicated in the routing. The terminated reason codes of this process comprise success, HLR failure to return, MSC failure to return, and MC internal failure. Wherein, since the process of the MSC dealing with the terminated message occupies the maximum resources, occupying the wireless air interface resources and relating to a large quantity of terminal user behaviors, its terminated reason code is able to accurately reflect the current processing result of the network element. The set of terminated reason codes in a certain time granularity reflects the operation status of current network element. The terminated failure reason codes can be further divided into: ① failure generated at the MSS (Mobile Switching Subsystem) network side, for example, the MSC is overloaded; ② failure due to non-user reasons at the BSS wireless side, for example, the air interface is busy; ③ failure due to user reasons at the BSS wireless side, for example, the terminal powers off or the memory is full.

The core idea of the present invention is that the MC adjusts the terminated flow control threshold of the MSC according to the blocking level of the MSC operation. If the blocking level of the MSC operation status is high, that is, the proportion of the terminated failure reason code of the network resource type is considerable, then the threshold can be reduced. The terminated failure reason codes involved in the present invention are the terminated failure reason codes of network resource type.

Figure 1:
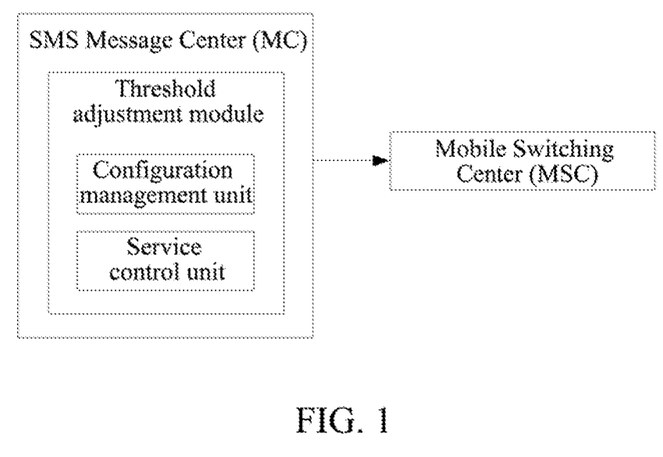
FIG. 1 is a structural schematic diagram of one specific embodiment of system in accordance with the present invention.

One embodiment of the system for controlling short message terminated flow in accordance with the present invention, as shown in FIG. 1, comprises a MC and a MSC. The MC is used to set the terminated flow control threshold of the MSC and to carry out the terminated flow control according to the threshold. The MC comprises a threshold adjustment module to dynamically set the terminated flow control threshold according to the operation blocking level of short message service of the MSC; and if the blocking level of the MSC operation status is high, that is the proportion of the terminated failure reason codes of the network resource type is considerable, and the threshold will be reduced.

The threshold adjustment module is further used to calculate the adjustment value of the terminated failure reason code in the current time granularity based on the control attributes corresponding to the terminated failure reason code and the proportion of the terminated failure reason code in the last time granularity, and to calculate the terminated flow control threshold in the current time granularity based on the adjustment value of the terminated failure reason code.

The threshold adjustment module further comprises a service control unit and a configuration management unit.

The threshold adjustment module is further used to configure the control attributes corresponding to the failure reason code, and to configure the list of the mobile switching center that needs flow control and the empirical value of terminated flow control threshold. In one embodiment, the aforementioned functions are implemented by the configuration unit in the threshold management module. The configuration management unit is further used to send the user configuration parameters to the threshold adjustment module synchronously. The configuration management unit is further used to provide the user interface for the administrators.

The control attributes comprise the proportion A of the failure reason code and the adjustment step length S, and the threshold adjustment module is further used to calculate the adjustment value of the failure reason code by the formula of $S \times R \div A$, wherein R is the proportion of the failure reason code in the last time granularity; the threshold adjustment module is further used to calculate and adjust the terminated flow control threshold by the following formula: $T - S \times R \div A$, wherein T is the empirical value of terminated flow control threshold of the MSC.

The calculation result is the terminated flow control threshold in the current time granularity, and the unit of the threshold is "short messages per second".

The threshold adjustment module is further used to control whether the terminated messages need to be delivered to the mobile switching center or not according to the terminated flow control threshold in the current time granularity. In an embodiment of the present invention, it might be implemented by the service control unit in the threshold adjustment module.

The service control unit is further used to normally deliver the messages to the mobile switching center when the number of terminated messages in the current time granularity is less than or equal to the flow control threshold in the current time granularity; and cache the messages in the MC to wait for the retransmitting policy to trigger delivering rather than deliver the messages directly to the MSC when the number of terminated messages in the current time granularity is greater than the flow control threshold in the current time granularity.

In this embodiment, there might be two or more than two failure reason codes, and the processing results of multiple failure reason codes are superimposed to the same terminated flow control threshold of the MSC, such as: $T - S1 \times R1 \div A1 - S2 \times R2 \div A2 \ldots \ldots$, wherein the proportion A1 of the failure reason code and the adjustment step length S1 are the proportion of the same failure reason code and the adjustment step length respectively, and R1 is the proportion of this failure reason code in the last time granularity; the proportion A2 of the failure reason code and the adjustment step length S2 are respectively the proportion of another failure reason code and the adjustment step length, and R2 is the proportion of another failure reason code in the last time granularity. Therefore, more failure reasons are generated due to the overload of short message service, the threshold is adaptively adjusted to a smaller value.

The configuration management unit is further used to set the empirical value of terminated flow control threshold.

The service control unit is further used to temporarily save the short messages to wait for retransmission or directly discard the short messages when the short message flow in the current time granularity reaches to the terminated flow control threshold.

This embodiment can be applied in the CDMA system. The typical terminated failure reason codes of the CDMA SMS message center can be found in 3GPP2 N.S0005 specification. The reason code 2 denotes the lack of network resources, which is usually the failure caused by lack of some resources in the internal processing of the MSC, such as, DID (Dialog ID) allocation failure; and the reason code 64 denotes the lack of wireless interface resources, such as the failure to assign the short message terminated in a newly established service channel. For these reasons, the terminated flow of the MSC should be reduced, so that the above resources can be restored to normal levels.

This embodiment can further be applied in the GSM system. The typical terminated failure reason codes of the GSM SMS message center can be found in 3GPP 29002 and 3GPP 23040 specifications.

Figure 2:
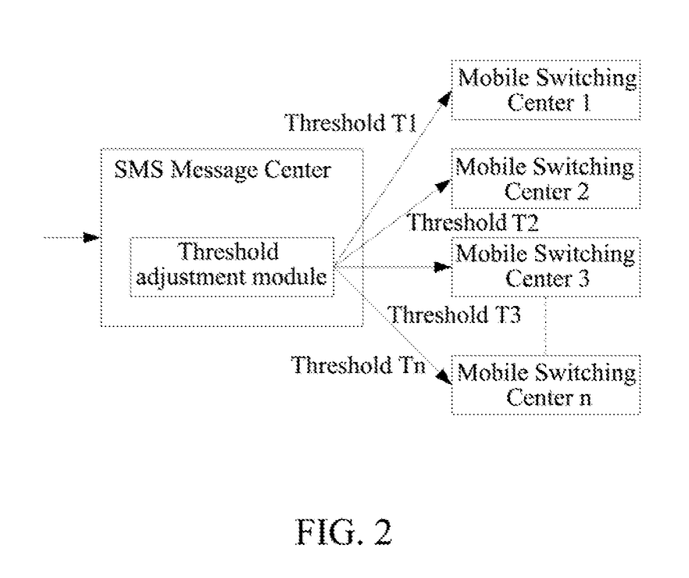
FIG. 2 is a structural schematic diagram of another specific embodiment of system in accordance with the present invention.

In another system embodiment of the present invention, as shown in FIG. 2, the MC might control the flow of a plurality of MSCs, and in this embodiment, the number of MSCs is n, and the flow control threshold configured and practically executed by each MSC might be different.

One embodiment of the method for short message terminated flow control in the present invention, comprises a process that a MC sets the terminated flow control threshold of a MSC and performs the terminated flow control according to the threshold, and the process comprises the step of the SMS message center dynamically setting the terminated flow control threshold according to the blocking level of short message service of the mobile switching center.

Figure 3:
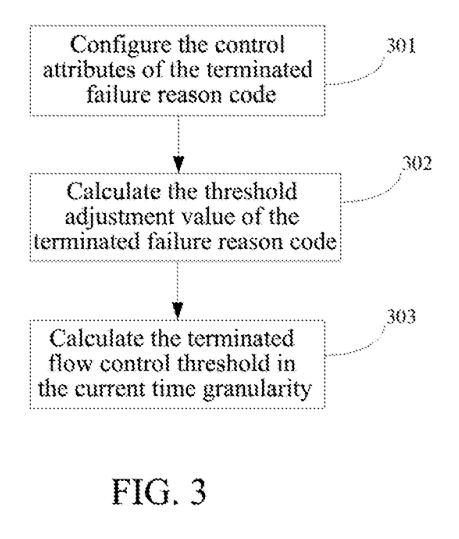
FIG. 3 is a flow chart of a specific embodiment for setting the terminated flow control threshold of method in accordance with the present invention.

In an embodiment of the present invention, the process of setting the terminated flow control threshold, as shown in FIG. 3, comprises the following steps specifically:

step S301: configuring the control attributes of the terminated failure reason codes; the MC configures the control attributes of the terminated failure reason codes of the CDMA or GSM short messages, and the control attributes comprise the proportion and the adjustment step length, respectively represented by A and S; if the terminated failure reason code is not involved in the control, the adjustment step length is not set or the adjustment step length is set as 0.

step S302: calculating the adjustment value of the terminated failure reason code; the adjustment value of the terminated failure reason code can be calculated by the formula of S×R÷A, wherein A is the proportion of the failure reason code in the last time granularity; and if there are a plurality of terminated failure reason codes, the adjustment value of each terminated failure reason code can be calculated respectively;

step S003, calculating the terminated flow control threshold in the current time granularity; the terminated flow control threshold in the current time granularity can be calculated by the following formula: T−S×R÷A, wherein T is the empirical value of the MSC terminated flow control threshold of MSC, which is set by the operator according to the MSC performance indicator. If there is a plurality of failure reason codes, such as n, the adjustment value of the terminated failure reason code is subtracted from them respectively, represented by T−S1×R1÷A1−S2×R2÷A2 . . . . . . −Sn×Rn÷An.

The process of terminated flow control according to the terminated flow control threshold is specifically implemented as follows: when the short message flow in the current time granularity reaches to the threshold, the MC saves the short massages temporarily to wait for retransmission or directly discards them; if the short message flow in the current time granularity does not reach to the threshold, the MC continues to send short massages to the MSC.

The First Embodiment

The first embodiment is to apply the method of the present invention to the CDMA MC to perform the short message terminated flow control, and the process comprises the following steps:

step S101: configure the specific MSC number (SMS_Address, short message routing address, referring to 3GPP2 N.S0005 specification) in the MC, and performs terminated flow control on short messages sent to the MSC, and each MSC corresponds to one threshold, and this threshold is set by the operator according to the MSC performance indicator;

step S102: the MC sets the control attributes including the proportion and the adjustment step length corresponding to the CDMA short message terminated failure reason code; if the reason code does not need to be involved in the control, the adjustment step length is not set or the adjustment step length is set as 0;

step S103: the MC records the reason code and MSC flow corresponding to each terminated every time when a MSC terminated response is returned, and calculates the actual terminated flow control threshold executed by the MSC in the next time granularity;

step S104: the MC initiates a SMSRequest request operation (short message routing request, referring to 3GPP2 N.S0005 specification) to the HLR, and counts the relevant MSCs when HLR returns the SMS_Address of the destination user of the short message;

step S105: when the corresponding flow of a certain MSC whose flow is under control reaches to the actual executed control threshold in the current time granularity, after the MC completes the SMSRequest request operation, it saves the short massages temporarily to wait for regular retransmission or directly discards them according to the retransmitting policy rather than initiate a SMDPP operation (short message point to point delivery request, referring to 3GPP2 N.S0005) to the visited MSC in the short message destination user.

step S106: when the corresponding flow of the MSC is less than the actual executed control threshold in the current time granularity, the MC initiates a SMDPP operation to the visited MSC directly according to the normal process.

step S107: when it is time to retransmit the short message, the MC repeats operations in the steps from S103 to S106 until the delivery is successful or the message fails permanently.

Figure 4:
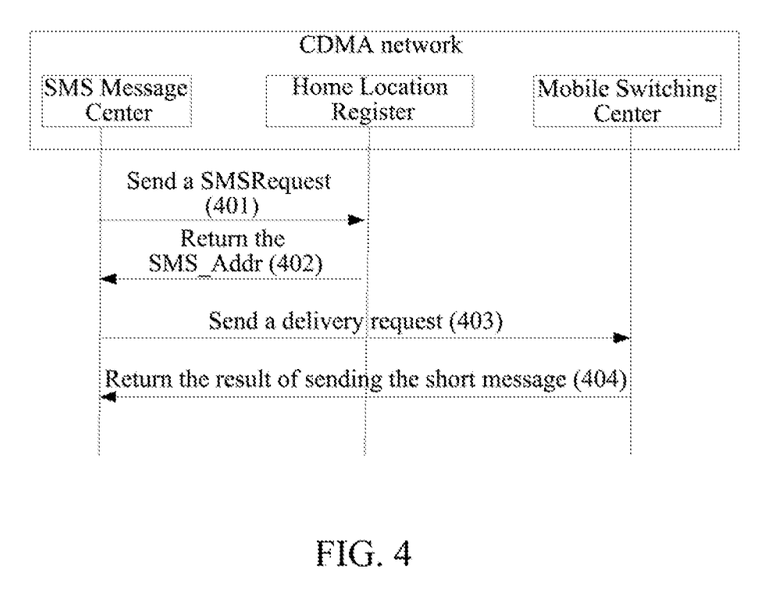
FIG. 4 is a flow chart of a CDMA SMS message center sending short messages of method example 1 in accordance with the present invention.

The process for the CDMA MC sending short messages in this embodiment, as shown in FIG. 4, comprises the following steps:

step 401: the MC initiates a SMSRequest request operation to the HLR; step 402: HLR returns the SMSRequest request operation result to the MC, and the result carries the routing address SMS_Address to which the short message will be sent, and it is generally a GT (Global Title) code of MSC, the IP address, or the No. 7 signaling point code and so on;

step 403: the MC initiates a short message terminated delivery request to the MSC corresponding to the SMS_Address after acquiring the routing address of the message;

step 404: the MSC returns the result of sending the short message to the MC.

Figure 5:
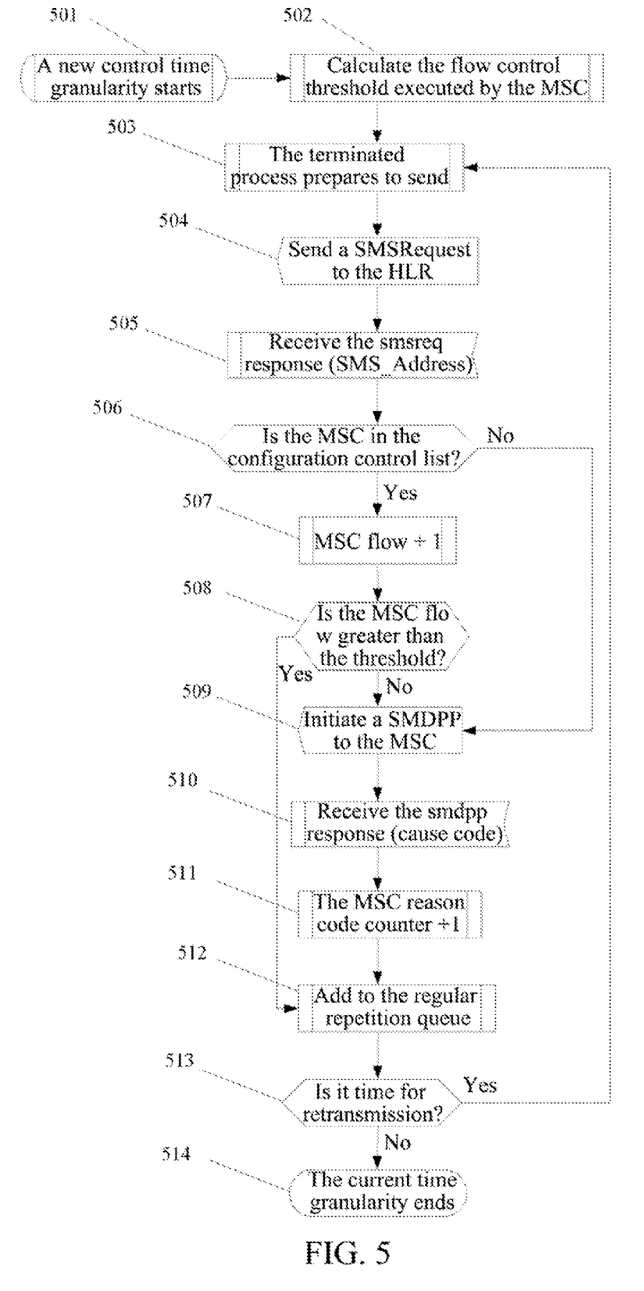
FIG. 5 is a flow chart of adaptive flow control of a CDMA SMS message center sending short messages of method example 1 in accordance with the present invention.

In this embodiment, all the terminated reason codes fail, and the process of the CDMA MC sending short messages to execute the adaptive flow control, as shown in FIG. 5, comprises the following steps:

step 501: a new control time granularity starts;

step 502: calculate the flow control threshold executed by each MSC in the current time granularity according to the flow control threshold set by each MSC, the proportion of each reason code, the adjustment step length and the actual proportion of each failure reason code in the last time granularity;

step 503: the short messages terminated process starts to send;

step 504: the MC initiates a SMSRequest request operation to the HLR;

step 505: the MC receives the SMSRequest operation response returned by the HLR, wherein the response carries the routing address SMS_Address, and acquires associated MSC number;

step 506: judge whether the MSC is in the MSC flow control list preset by MC, and if yes, sequentially proceed to step 507; otherwise proceed to step 509 directly;

step 507: set the terminated flow counter of MSC plus 1;

step 508: judge whether the terminated flow of MSC in the current time granularity exceeds the actual executed flow control threshold or not, and if yes, proceed to the step 512; otherwise continue proceeding to step 509;

step 509: initiate a SMDPP terminated request operation to the MSC;

step 510: receive the terminated response from the MSC;

step 511: if the MSC is in the control list, the corresponding terminated code counter of this MSC is added by 1;

step 512: cache the short message currently to be sent into the SMS message center, and set one timer and prepare for retransmission;

step 513: judge whether the short message retransmitting timer expires or not, and if no, proceed to step 514; otherwise continue to start from step 503 until the short message terminated succeeds or fails permanently;

step 514: the current control time granularity ends.

The Second Embodiment

This embodiment applies the method of the present invention to the GSM MC to perform the short message terminated flow control, and the process comprises the following steps:

step S201: configure a specific MSC number in the MC, and the MC will perform terminated flow control for short messages sent to the above MSC; each MSC corresponds to one threshold which is configured by the operator according to the MSC performance indicator;

step S202: configure the control attributes of the GSM short message terminated failure reason code in the MC; and the control attributes comprise the proportion and the adjustment step length; and if the reason code does not need to be involved in the control, the adjustment step length is not set or the adjustment step length is set as 0;

step S203: every time when the MSC terminated response is returned, the MC recodes the reason code and MSC flow corresponding to the current terminated, and calculates the actual terminated flow control threshold executed by MSC in the next time granularity;

step S204: the MC initiates a MAP-SEND-ROUTING-INFO-FOR-SM request operation (short message routing request, referring to 3GPP 29002 specification) to the HLR, and the MC counts the associated MSCs when the HLR returns the visited MSC number of the destination user of the short message;

step S205: when the flow corresponding to a certain MSC whose flow is under control in the current time granularity reaches to the actual executed control threshold, the MC doesn't execute MAP-MT-FORWARD-SHORT-MESSAGE operation (short message terminated delivery request, referring to 3GPP 29002 specification) for the visited MSC of the destination user of the short message after completing the MAP-SEND-ROUTING-INFO-FOR-SM request operation, instead it saves the short massage temporarily in the MC to wait for regular retransmission or directly discards the message according to the retransmitting policy;

step S206: when the corresponding flow of the MSC in the current time granularity is less than the actual executed control threshold, the MC directly initiates a MAP-MT-FORWARD-SHORT-MESSAGE operation to the visited MSC according to the normal process;

step S207: when it is time to retransmit the short message, the MC repeats operations in the steps from 5203 to 5206 until the delivery succeeds or fails permanently.

Figure 6:
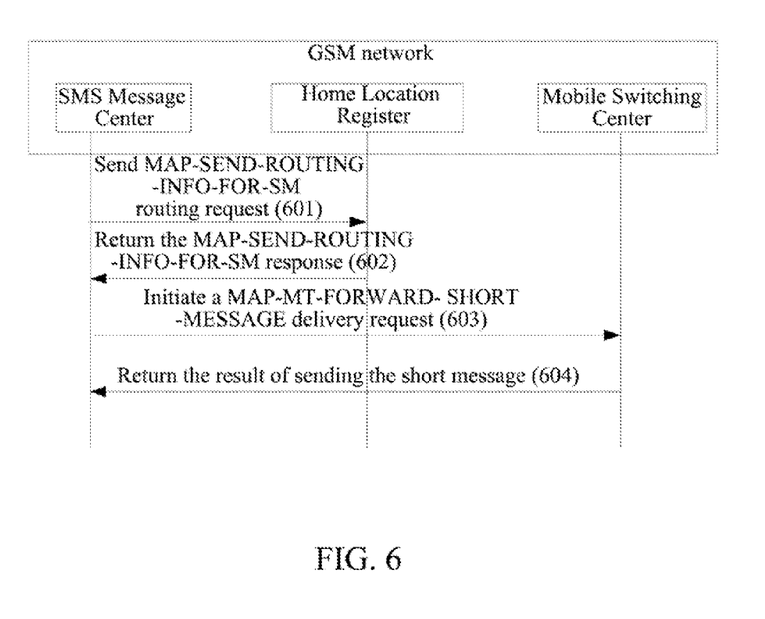
FIG. 6 is a flow chart of a GSM SMS message center sending short messages of method example 2 in accordance with the present invention.

In this embodiment, the process of the GSM MC sending short messages, as shown in FIG. 6, comprises the following steps:

step 601: the MC initiates a MAP-SEND-ROUTING-INFO-FOR-SM routing request operation to the HLR;

step 602: the HLR returns the routing request operation result to the MC, and the result carries the MSC number to which the short message will be sent, and it is generally the GT (Global Title) code of the MSC, the IP address, or the No. 7 signaling point code and so on;

step 603: the MC initiates a MAP-MT-FORWARD-SHORT-MESSAGE short message terminated delivery request operation to the MSC after acquiring the routing address of the message;

step 604: the MSC returns the result of sending the short message to the MC.

Figure 7:
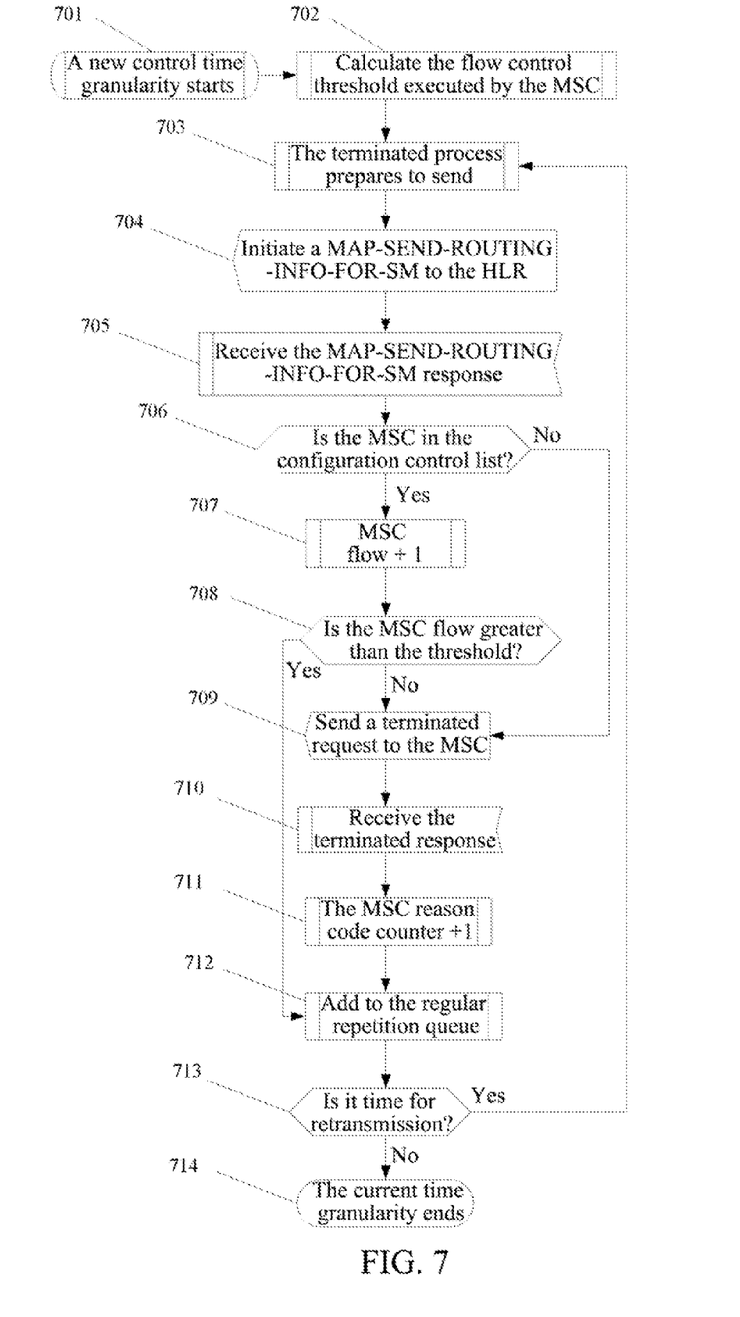
FIG. 7 is a flow chart of adaptive flow control of a GSM SMS message center sending short messages of method example 2 in accordance with the present invention.

In this embodiment, all the terminated reason codes fails, and the process of the GSM MC sending short messages to execute the adaptive flow control, as shown in FIG. 7, comprises the following steps:

step 701: a new control time granularity starts;

step 702: calculate the flow control threshold executed by each MSC in the current time granularity according to the flow control threshold set by each MSC, the proportion of each reason code, the adjustment step length and the actual proportion of each failure reason code in the last time granularity;

step 703: the short messages terminated process starts to send;

step 704: the MC initiates a MAP-SEND-ROUTING-INFO-FOR-SM request operation to the HLR;

step 705: the MC receives the MAP-SEND-ROUTING-INFO-FOR-SM operation response returned by the HLR, and the response carries the MSC number;

step 706: judge whether the MSC is in the MSC flow control list preset by the MC or not, and if yes, sequentially proceed to step 707; otherwise proceed to step 709 directly;

step 707: set the terminated flow counter of MSC plus 1;

step 708: judge whether the MSC terminated flow in the current time granularity exceeds the actual executed flow control threshold or not, and if yes, proceed to the step 712; otherwise continue proceeding to step 709;

step 709: initiate a MAP-MT-FORWARD-SHORT-MESSAGE terminated request operation to the MSC;

step 710: receive the terminated response from the MSC;

step 711: if the MSC is in the control list, the corresponding reason code counter of this MSC is added by 1;

step 712: cache the short message to be sent into the SMS message center, and set one timer and prepare for retransmission;

step 713: judge whether the short message retransmitting timer expires or not, and if no, proceed to step 714; otherwise continue to start from step 703 until the short message terminated succeeds or fails permanently;

step 714: the current control time granularity ends.

The above description is to illustrate the present invention in further detail by the specific preferred embodiments, and is not intended to limit the specific implementation of present invention to these descriptions. For ordinary people skilled in the art, without departing from the idea of the present invention, there are several simple deductions or replacement, all of which should belong to the protection scope of the present invention.

INDUSTRIAL APPLICABILITY

By the SMS message center dynamically setting the terminated flow control threshold according to the operation blocking level of short message service of MSC, the present invention implements the adaptive control of the MSC terminated flow and improves the effectiveness of the flow control; the SMS message center of the present invention sets the terminated flow control threshold of the mobile switching center in the current time granularity according to the terminated failure reason codes in the last time granularity, which has the real-time characteristic and can accurately adjust the short message terminated flow; the present invention configures the control attributes of the terminated failure reason code of the MSC in the current time granularity, and calculates the adjustment value of the terminated failure reason code in the current time granularity according to the control attributes and the proportion of the terminated failure reason code in the last time granularity, and adjusts the terminated flow control threshold in the current time granularity according to the adjustment value of the terminated failure reason code in the current time granularity, which truly reflects the blocking level of the MSC operation status and further improves the effectiveness of the control; the present invention uses the threshold adjustment calculation formula to update the threshold, therefore the calculation is simple and the implementation is convenient.

What is claimed is:

1. A method for controlling flow of short messages to terminals, comprising:
   a SMS message center dynamically setting a control threshold for the flow of short messages to terminals based on the degree of congestion of short message service on a mobile switching center;
   and said SMS message center performing control on the flow of short messages to terminals according to the threshold;
   wherein the step of the SMS message center dynamically setting the control threshold for the flow of short messages to terminals comprises: the SMS message center setting the control threshold for the flow of short messages to terminals on the mobile switching center in current granularity of time according to terminated failure reason codes in previous granularity of time.

2. The method of claim 1, wherein the step of the SMS message center setting the terminated flow control threshold of the mobile switching center in the current granularity of time according to the terminated failure reason codes in the previous granularity of time comprises:
   step S001, the SMS message center configuring control attributes of the terminated failure reason code in the previous granularity of time;
   step S002, the SMS message center calculating an adjustment value of the terminated failure reason code in the current granularity of time based on the control attributes configured in the step S001 and a proportion of the terminated failure reason code in the previous granularity of time; and
   step S003, the SMS message center calculating the terminated flow control threshold in the current granularity of time based on the adjustment value of the terminated failure reason code calculated in the step S002.

3. The method of claim 2, wherein after the step S003, the method further comprises:
   when a terminated flow in the current granularity of time is less than or equal to the terminated flow control threshold in the current granularity of time, the SMS message center normally delivering the terminated in the current granularity of time to the mobile switching center; and
   when the terminated flow in the current granularity of time is greater than the terminated flow control threshold in the current granularity of time, the SMS message center saving the terminated in the current granularity of time temporarily to wait for retransmission, or directly discarding the terminated in the current granularity of time.

4. The method of claim 3, wherein
   the control attributes in the step S001 comprise: proportion A of the terminated failure reason code and adjustment step length S;
   the adjustment value of the terminated failure reason code in the step S002 is calculated by a following formula: $S \times R \div A$, wherein R is the proportion of the terminated failure reason code in the previous granularity of time;
   the terminated flow control threshold in the step S003 can be calculated by a following formula: $T - S \times R \div A$, wherein T is an empirical value of the terminated flow control threshold of the mobile switching center.

5. The method of claim 4, wherein,
   the number of the terminated failure reason codes in the previous granularity of time is n, and n is a natural number greater than 1;
   said step S001 comprises the SMS message center configuring control attributes of each of the failure reason codes;
   said step S002 comprises the SMS message center calculating the adjustment value of the terminated failure reason code of each of the failure reason codes based on the control attributes and proportion of each of the failure reason codes, wherein R is a proportion of each of the terminated failure reason codes;
   said step S003 comprises the SMS message center calculating the terminated flow control threshold based on the adjustment value of the terminated failure reason code of each of the failure reason codes, and the terminated flow control threshold being calculated by a following formula: $T - S_1 \times R_1 \div A_1 - S_2 \times R_2 \div A_2 \ldots - S_n \times R_n \div A_n$, wherein R1 is an adjustment value of the terminated failure reason code of a first terminated failure reason code in the terminated failure reason codes, and R2 is an adjustment value of the terminated failure reason code of a second terminated failure reason code in the terminated failure reason codes, and Rn is an adjustment value of the terminated failure reason code of a $n^{th}$ terminated failure reason code in the terminated failure reason codes; and T is the empirical value of the terminated flow control threshold of the mobile switching center.

6. The method of claim 5, wherein said step S003 further comprises the SMS message center setting the empirical value of the terminated flow control threshold.

7. The method of claim 2, wherein
   the control attributes in the step S001 comprise: proportion A of the terminated failure reason code and adjustment step length S;
   the adjustment value of the terminated failure reason code in the step S002 is calculated by a following formula: $S \times R \div A$, wherein R is the proportion of the terminated failure reason code in the previous granularity of time;

the terminated flow control threshold in the step S003 is calculated by a following formula: T−S×R÷A, wherein T is an empirical value of the terminated flow control threshold of the mobile switching center.

8. The method of claim 7, wherein,
the number of the terminated failure reason codes in the previous granularity of time is n, and n is a natural number greater than 1;
said step S001 comprises the SMS message center configuring control attributes of each of the failure reason codes;
said step S002 comprises the SMS message center calculating the adjustment value of the terminated failure reason code of each of the failure reason codes based on the control attributes and proportion of each of the failure reason codes, wherein R is a proportion of each of the terminated failure reason codes;
said step S003 comprises the SMS message center calculating the terminated flow control threshold based on the adjustment value of the terminated failure reason code of each of the failure reason codes, and the terminated flow control threshold being calculated by a following formula: T−S1×R1÷A1−S2×R2÷A2 . . . −Sn×Rn÷An, wherein R1 is an adjustment value of the terminated failure reason code of a first terminated failure reason code in the terminated failure reason codes, and R2 is an adjustment value of the terminated failure reason code of a second terminated failure reason code in the terminated failure reason codes, and Rn is an adjustment value of the terminated failure reason code of a $n^{th}$ terminated failure reason code in the terminated failure reason codes; and T is the empirical value of the terminated flow control threshold of the mobile switching center.

9. The method of claim 8, wherein said step S003 further comprises the SMS message center setting the empirical value of the terminated flow control threshold.

10. A threshold adjustment module, said threshold adjustment module being configured to dynamically set a control threshold for the flow of short message to terminals based on the degree of congestion of short message service on a mobile switching center;
wherein the threshold adjustment module is further configured to set the control threshold for the flow of short messages to terminals on the mobile switching center in current granularity of time according to terminated failure reason codes in previous granularity of time.

11. The threshold adjustment module of claim 10, wherein the threshold adjustment module is further configured to configure control attributes of the terminated failure reason code, and calculate an adjustment value of the terminated failure reason code in the current granularity of time based on the control attributes and a proportion of the terminated failure reason code, and calculate the terminated flow control threshold in the current granularity of time of the short message service of the mobile switching center based on the adjustment value of the terminated failure reason code.

12. The threshold adjustment module of claim 11, wherein the control attributes comprise proportion A of the terminated failure reason code and adjustment step length S;
the threshold adjustment module is further configured to calculate the adjustment value of the terminated failure reason code by a formula of S×R÷A, wherein R is the proportion of the terminated failure reason code; and calculate the terminated flow control threshold in the current granularity of time by a following formula: T−S×R÷A, wherein T is an empirical value of the terminated flow control threshold of the mobile switching center.

13. The threshold adjustment module of claim 12, wherein the number of the terminated failure reason codes in the previous granularity of time is n, and n is a natural number greater than 1;
the threshold adjustment module is further configured to:
calculate the adjustment value of the terminated failure reason code of each of the terminated failure reason codes by the formula of S×R÷A, wherein R is a proportion of the terminated failure reason code of each of the terminated failure reason codes; and
calculate the terminated flow control threshold in the current granularity of time by a following formula: T−S1×R1÷A1−S2×R2÷A2 . . . −Sn×Rn÷An, wherein R1 is an adjustment value of the terminated failure reason code of a first terminated failure reason code in the terminated failure reason codes, and R2 is an adjustment value of the terminated failure reason code of a second terminated failure reason code in the terminated failure reason codes, and Rn is an adjustment value of the terminated failure reason code of a $n^{th}$ terminated failure reason code in the terminated failure reason codes; and T is the empirical value of the terminated flow control threshold of the mobile switching center.

14. The threshold adjustment module of claim 13, wherein the threshold adjustment module is further configured to set the empirical value of the terminated flow control threshold.

15. The threshold adjustment module of claim 14, wherein the threshold adjustment module is further configured to:
when a terminated flow in the current granularity of time is less than or equal to the terminated flow control threshold in the current granularity of time, normally deliver the terminated in the current granularity of time to the mobile switching center; and
when the terminated flow in the current granularity of time is greater than the terminated flow control threshold in the current granularity of time, save the terminated in the current granularity of time temporarily to wait for retransmission or directly discard the terminated in the current granularity of time.

16. The threshold adjustment module of claim 15, wherein there is a plurality of the mobile switching centers;
the threshold adjustment module is further configured to dynamically set the terminated flow control threshold of short message service of each of the mobile switching centers according to the operation blocking level of the short message service of each of the mobile switching centers.

17. A system for controlling flow of short messages to terminals, comprising a SMS message center, and the SMS message center comprising the threshold adjustment module of claim 10.

* * * * *